US006717660B1

(12) United States Patent
Bernardo

(10) Patent No.: US 6,717,660 B1
(45) Date of Patent: Apr. 6, 2004

(54) SYSTEM FOR MONITORING AND TESTING OF LIGHT SOURCES

(75) Inventor: James S. Bernardo, White Plains, NY (US)

(73) Assignee: Safe Passage Systems Corporation, Somers, NY (US)

(*) Notice: Subject to any disclaimer, the term of this patent is extended or adjusted under 35 U.S.C. 154(b) by 206 days.

(21) Appl. No.: 09/629,352

(22) Filed: Aug. 1, 2000

(51) Int. Cl.[7] .................................................. G01J 1/00

(52) U.S. Cl. ....................... 356/121; 315/130; 315/131; 315/132; 315/134; 315/136; 315/149; 315/155; 340/3.1; 340/3.9; 340/7.1; 340/506; 340/7.21; 340/7.32; 340/7.33; 340/7.36

(58) Field of Search .................. 356/121; 315/130–132, 315/134, 136, 149–155; 340/3.1, 3.9, 7.1, 506, 7.21, 7.32, 7.33, 7.36, 540, 641, 642, 825.06, 825.35, 515, 516, 500, 502–508, 513, 521, 524, 525, 545.4, 2.24, 7.22, 7.24, 7.25–29

(56) References Cited

U.S. PATENT DOCUMENTS 4,977,353 A * 12/1990 Helal et al. ................. 315/130
5,220,321 A * 6/1993 Sauer ......................... 340/642
5,243,340 A * 9/1993 Norman et al. ............. 315/130
5,426,429 A * 6/1995 Norman et al. ............. 315/130
5,521,852 A * 5/1996 Hibbs et al. ................ 345/418
5,625,260 A * 4/1997 Millgard ..................... 315/136
5,638,057 A * 6/1997 Williams .................... 340/947
5,644,304 A * 7/1997 Pavarotti et al. ............ 315/130
5,774,052 A * 6/1998 Hamm et al. ............... 340/540
5,811,975 A 9/1998 Bernardo
5,815,417 A * 9/1998 Orr et al. .................... 340/506
5,945,993 A * 8/1999 Fleischmann ............... 345/771
5,973,616 A * 10/1999 Grebe et al. ................ 340/7.1
6,060,994 A * 5/2000 Chen .......................... 340/3.9
6,160,477 A * 12/2000 Sandelman et al. ......... 340/506
6,211,782 B1 * 4/2001 Sandelman et al. .......... 340/3.1
6,218,953 B1 * 4/2001 Petite ......................... 340/3.1

FOREIGN PATENT DOCUMENTS

EP 0470034 A2 * 7/1991 ........... G01R/31/00
EP 0470034 A3 * 7/1991 ............ H04B/3/54
EP 0 470 034 A2 2/1992
GB 2 176 640 A 12/1986
GB 2176640 A * 12/1986 ........... G08B/19/00

* cited by examiner

*Primary Examiner*—John H. Lee
*Assistant Examiner*—Bernard E. Souw
(74) *Attorney, Agent, or Firm*—Oppenheimer Wolff & Donnelly LLP

(57) ABSTRACT

A light monitoring system provides a sensing unit coupled to a luminaire. The sensing unit monitors both the input and the output of the luminaire for both current and voltage. In this manner, a variety of problems with the luminaire can be detected by the sensor and this information can be passed to monitoring equipment that is either hard-wired or remotely coupled to the sensing unit.

43 Claims, 3 Drawing Sheets

SYSTEM FOR MONITORING AND TESTING OF LIGHT SOURCES

BACKGROUND OF THE INVENTION

1. Field of the Invention

The present invention relates to a system for monitoring light sources. More particularly, the present invention relates to a system for sensing the condition and efficiency of various light sources, or luminaires, and reporting this information to a monitoring station.

2. Description of the Related Art

There are a wide variety of lighting sources or luminaires that are critical to the operation of their associated infrastructure. For example, the proper functioning of traffic lights is absolutely essential to the safety and management of countless people each day. Likewise, street lights and other overhead outdoor luminaires allow for safe and convenient travel during night time conditions. While the reasons for maintaining proper lighting conditions in various indoor and outdoor facilities is important for certain obvious reasons, the nature of those facilities sometimes makes proper maintenance an even more critical aspect. For example, various banks provide ATM machines in a plurality of different types of locations. Since these machines will function to draw traffic dealing in cash transactions, it is desirable to maintain these machines in a safe and well-lit condition. That is, if the lighting should fail in such an area, people obtaining cash from ATMs may be at a higher risk for crime and possibly personal attack.

Thus, there exists a distinction between lighting provided for convenience and lighting provided for safety and necessity. In those systems where lighting becomes more critical, the proper functioning of the luminaire takes on more importance and significance. Thus, there exists a need to provide a system that monitors the performance of these critical luminaire systems and provides a way to indicate potential problems to managing authorities.

In other situations, it is beneficial to monitor lighting performance where lighting is being provided for convenience. For example, in a large office building, it is a continual challenge to keep all luminaires operational. A system that could monitor the performance of these light fixtures would be very helpful in maintaining adequate light for occupants.

SUMMARY OF THE INVENTION

The present invention provides a system for monitoring the performance of any luminaire and reporting problems or failures to a managing authority so that the proper corrective action can be implemented. For each lighting element or luminaire a sensor or sensors are provided that monitors the operational characteristics (e.g. both the electrical input and the output) of the luminaire. The sensors are capable of monitoring both voltage across the fixture and current travelling therethrough. Further, the sensors can monitor the relative voltage and current levels at both the input and output. In this manner a wide variety of problems can be detected. For example, a failure to detect current or voltage on the output side would indicate a broken or damaged bulb and/or a filament. Detecting unusual current readings could also indicate that the light, while functional, is not necessarily providing a sufficient degree of illumination. By also monitoring the current input into the luminaire, along with the voltage drop across the luminaire, the efficiency of that luminaire can be monitored; Variations in the determined efficiency can indicate that a failure is imminent, allowing for the replacement of the luminaire prior to an actual failure. In addition, the sensor is able to verify that power is being properly delivered to the input of the luminaire. Thus, if a failure should occur, maintenance personnel can immediately be notified of what the actual problem is rather than having to further test the system upon arrival.

For each luminaire, a separate sensor or sensing system is provided. Therefore, the number of luminaires and sensors employed will be dependent upon the particular application. For example, in a given ATM location, a single overhead light may be all that is required to provide sufficient illumination, hence, only one sensor is required. In most common traffic lights, three separate luminaires are provided for each direction of observation and each luminaire may include multiple bulbs. Thus, a separate sensing unit is provided for each bulb of each luminaire. As should be readily apparent, the number of luminaires and sensing units employed in a given system can vary dramatically. Likewise, the system used to monitor the various sensing units can vary from simple to complex.

In one embodiment of the present invention a control system is provided that is electrically coupled to each of the sensing units being utilized. The control serves to operate the sensing unit and to gather information collected by the various sensors. In addition, it may be more practical to periodically sense any given luminaire rather than taking continuous measurements. If this is the case, a control unit will then individually poll the various sensors at the allotted time to take the appropriate measurements. Depending upon the application being used, the control unit can be programmed to cause various remedial actions to occur if the sensors determine a problem. For example, in the context of an automatic teller machine, if it is determined that insufficient illumination is provided to create a safe atmosphere, the control may cause the ATM to become disabled, thus preventing its subsequent use until the luminaire is repaired.

When a problem is detected, the control system in the present invention is caused to alert the appropriate personnel to the problem. In its simplest form, the control unit can simply be hard wired to a control panel within a maintenance room of a building. For various remote systems including traffic lights, street lights and diversely located ATMs, such a hard wiring scenario is not practical. In those cases, a control system is provided with a transmitter that sends the data to a receiver connected to a remote piece of monitoring equipment. The monitoring equipment can receive such signals from a large number of controlling units and hence monitor an even larger number of sensors. Thus, the single piece of monitoring equipment can effectively monitor the operative status of a large number of traffic lights over a large land area and when problems develop, initiate appropriate remedial action.

As yet another aspect of the present invention, the monitoring equipment may be connected to via a remote terminal by accessing a computer network such as the Internet. For example, a store owner using such sensors and a control unit to monitor the luminaires of a security system in a store during off-business hours, could simply access the Internet and obtain instantaneous results from the control unit relating to the operative status of the illumination system.

Once the system is implemented to effectively monitor the various luminaires, other equipment could similarly be monitored. For example, by providing appropriate sensing units in a computer system, signals could be produced indicating whether sufficient power is being supplied. By having this equipment attached to the monitoring network, appropriate use signals could be remotely or locally provided to initiate remedial action when necessary. For example, should main power be interrupted an appropriate signal could be provided to a system administrator's pager indicating that some attention is necessary. Many other examples exist where the monitoring of power supplies and electrical characteristics can provide useful information to various operators or service personnel.

It is an object of the present invention to provide a sensor for a luminaire to determine its operative status.

It is a further object of the present invention to provide a sensing unit connected to both the input and the output of a luminaire.

It is still yet another object of the present invention to provide the sensing unit coupled to a luminaire that measures both current and voltage at both and input and an output.

It is yet still another object of the present invention to provide a control unit coupled to one or more sensing units to control the sensing units and gather data.

It is still yet a further object of the present invention to couple a transmitter to the control unit so that the control unit can provide data to a remote location.

DETAILED DESCRIPTION OF THE PREFERRED EMBODIMENT

Figure 1:
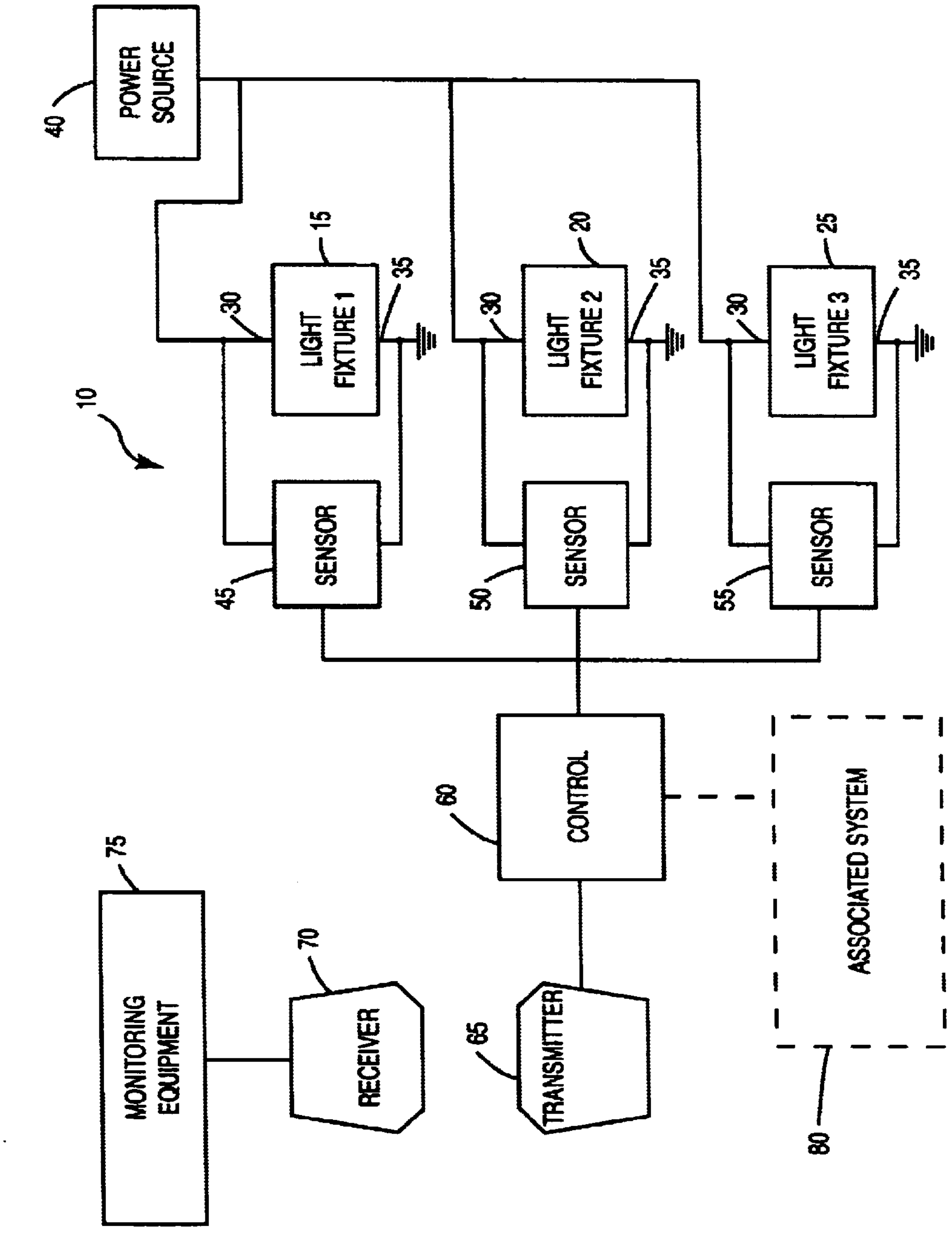
FIG. 1 is a block diagram schematically illustrating the monitoring and sensing system of the present invention.

Referring to FIG. 1, a light monitoring system is illustrated and is generally referred to as 10. Light monitoring system 10 is associated with one or more luminaires 15, 20, 25. Such luminaires 15, 20, 25 represent any lighting element that would benefit from being monitored. For example, such lighting elements could be within traffic lights, street lights, ATM illumination systems or other security systems. Of course, there are any number of reasons to monitor a plethora of different lighting systems that the present invention is applicable to.

As illustrated, each luminaire 15, 20, 25 has an input 30 and output 35. Input 30 is coupled to an appropriate power source 40 while output 35 is coupled to ground. In most cases, power source 40 will simply be line voltage. However, the present invention also relates to systems using battery power. Thus, input 30 and output 35 simply represent the power supply to luminaires 15, 20, 25 but can also represent the control line for actuating and controlling those same luminaires.

For each luminaire 15, 20, 25 an independent sensing unit 45, 50, 55 is respectively coupled thereto. As illustrated, each sensing unit 45, 50, 55 is coupled to both the input 30 and output 35 of each luminaire 15, 20, 25. Of course, while three sensing units and three luminaires have been illustrated, any number can actually be employed depending upon the system in use. Furthermore, while it is preferable to have an independent sensing unit coupled to each luminaire, it is possible to have a single sensing unit coupled to a plurality of luminaires wherein that particular sensing unit simply cycles through its various inputs in the different luminaires.

Each sensing unit 45, 50, 55 is capable of measuring both current and voltage at both input 30 and output 35. This allows sensing units 45, 50, 55 to determine whether each of luminaires 15, 20 and 25 are operating properly and if not operating properly, to accurately determine what the particular problem is. For example, if no current is received at output 35 at a time when it should be, and proper power levels are detected at input 30, then the appropriate sensor 45, 50, 55 determines that power is not flowing through the particular luminaire 15, 20, 25. The most common cause for such a problem would be a broken filament or an otherwise inoperative bulb. A more extreme cause would be actual physical damage to the luminaire itself, such as a cut or severed wire. If the appropriate levels of current or voltage are not detected at input 30, then sensing unit 45, 50, 55 determines that the problem lies with the power source 40. Finally, if voltage or current levels are detected at output 35 that are lower than they should be, then sensing unit 45, 50, 55 determines that there is a problem with luminaire 15, 20, 25 that may require maintenance in the future. For example, as the efficiency of any given luminaire 15, 20, 25 decreases it may be indicative of an imminent failure. It is possible for sensing unit 45, 50, 55 to determine the operative illumination of luminaires 15, 20, 25 to determine whether the problem needs immediate attention or can be delayed for some time.

Operatively coupled to each sensing unit 45, 50, 55 is a control unit 60. While one control unit 60 is illustrated for three sensing units 45, 50, 55 it is to be understood that the particular number and arrangement of control units 60 is variable. For example, each sensing unit 45, 50, 55 could be incorporated with its own control unit. Control unit 60 acts to cause sensing units 45, 50, 55 to take measurements at the appropriate times. For example, sensing units 45, 50, 55 could take continuous measurements from each luminaire 15, 20, 25 or could take such measurements at any predetermined interval. Furthermore, control unit 60 could cause sensing unit 45, 50, 55 to take measurements at different intervals if any type of problem is detected with one or more of the luminaires 15, 20, 25. For example, if it is determined that light fixture 15 is operating less efficiently than it should, sensing unit 45 may be caused to take more frequent measurements because it is assumed that some type of failure is imminent.

Control unit 60 can be coupled to an associated system 80. Associated system 80 is generally representative of the system relying on luminaire 15, 20, 25. For example, in the context of a traffic light, associated system 80 would include the traffic signal and its control system. In the context of an ATM, associated system 80 would be the control system controlling the ATM and/or any locking mechanisms surrounding it. Thus, the various luminaires can be integral with or separate from associated system 80. Control unit 60 can be programmed to take remedial action through associated system 80 if a significant problem is determined in any luminaire 15, 20, 25. For example, assuming use with an ATM machine, if it is determined that insufficient illumination is provided, control unit 60 may cause the ATM to become inoperative and where appropriate, access to that ATM machine may be prevented. This occurs when control unit 60 sends an appropriate instruction to associated system 80.

Control unit 60 is operatively coupled to monitoring equipment 75. Monitoring equipment 75 is used to alert the appropriate maintenance personnel to the status of, and indicate any failures of luminaires 15, 20, 25. In the simplest form, control unit 60 may simply be hard wired to monitoring equipment 75. In many cases however this simply will not be practical, such as when light monitoring system 10 is used to monitor traffic lights, street lights or illumination systems in remote ATM units. In such cases, control unit 60 is provided with transmitter 65 which is capable of transmitting data to receiver 70 that is operatively coupled to monitoring equipment 75. Monitoring equipment 75 can in this manner monitor the receipt of data from a plurality of control units 60. When appropriate or desired, transmitter 65 and receiver 70 can be fabricated as transceivers so that monitoring equipment 75 can send signals to control unit 60 to further test the luminaire 15, 20, 25 or to control the above-noted associated systems.

Monitoring equipment 75 can be configured so as to allow remote access via a computer network, such as the Internet. In such a case, an operator can utilize a computer to access monitoring equipment 75 to determine the status of various luminaire 15, 20, 25. This allows for convenient and remote access to light monitoring system 10 without requiring a dedicated piece of equipment. In such a context, monitoring equipment 75 can actually be physically incorporated with control unit 60. Thus, a relatively small piece of equipment can be coupled to important luminaire and provide data to a remote observer.

As an illustrative example, assume the element within luminaire 15 breaks due to continued use over time. Power source 40 continues to deliver appropriate levels of current and voltage to luminaire 20 and 25. These power levels are also measurable at input 30 by sensing unit 45. However, sensing unit 45 will not detect any current or voltage levels at output 35. Thus, sensing unit 45 provides these measurements to control unit 60. Control unit 60 then determines that the lighting element within light fixture 15 has become inoperative. In this example, luminaires 15, 20, 25 represent a typical traffic signal. When control unit 60 determines that luminaire 15 has become inoperative (and assuming no back up exists) control unit 60 may initiate appropriate remedial action through associated system 80. For example, with one luminaire 15 not functioning, it may be appropriate to cause a traffic signal to flash red. While possibly an inconvenience to passing motorists, it provides the safest condition until the traffic signal can be repaired. As this occurs, control unit 60 sends data indicating luminaire 15 is inoperative to monitoring equipment 75. Once so received, the appropriate maintenance personnel can determine that repair is required and dispatch the appropriate personnel to the traffic signal to repair luminaire 15. Once so repaired, sensing unit 45 is able to verify that luminaire 15 is functioning properly. Thus, control unit 60 can automatically revert the traffic signal back to its normal status. Alternatively, rather than programming control unit 60 to so control the traffic signal, such decisions can be made by observing personnel and passed to control unit 60 from monitoring equipment 75.

In addition to the monitoring of luminaires, the present system can be easily configured to monitor electrical characteristics of other components. For example, the power conditions of a computer system could easily be monitored. By providing a sensing unit which measures both relative voltage levels and electrical current, the functional characteristics of the computer system can be monitored. This type of sensing system can easily be connected to the control unit 60 and all other associated equipment. In this way, useful information regarding all types of electrically powered equipment can be utilized.

Figure 2:
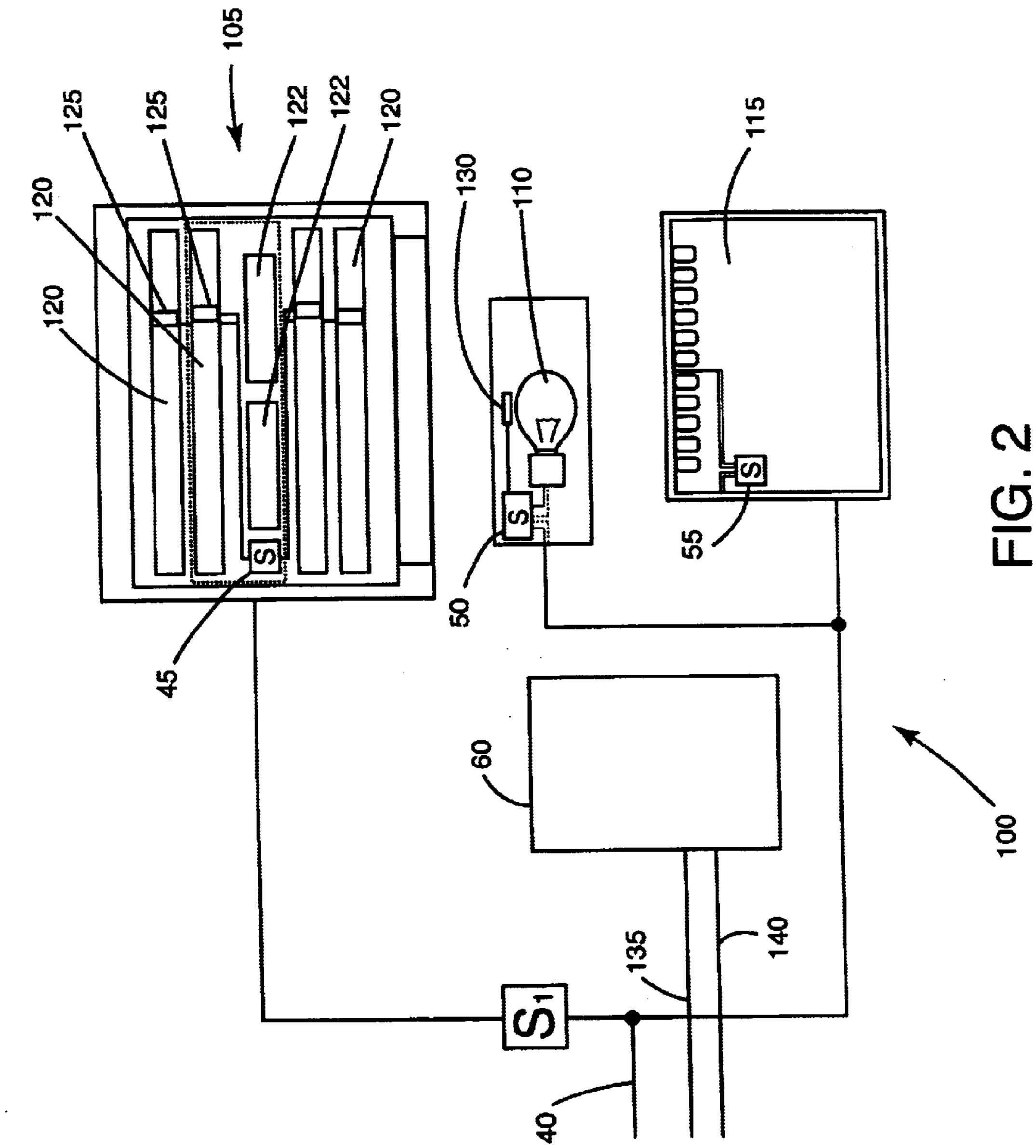
FIG. 2 is a schematic illustration of the monitoring and testing system of the present invention as used with three different types of luminaires.

Referring to FIG. 2, a monitored system 100 is illustrated to show how the present monitoring and sensing system might interact with three different types of luminaires. As before, a power source 40 feeds current into the system. Control unit 60 is provided and may have a separate power line 140 for its own power supply. A florescent luminaire 105 is provided as a light source. Florescent luminaire includes a plurality of florescent lamps 120 that are operatively coupled to lamp ballast 122 in the known way. Sensor 45 is provided and is disposed between power source 40 and the various florescent lamps 120. Coupled to each florescent lamp 120 is a photo sensor 125 that is connected to sensor 45.

An incandescent luminaire 110 is provided. Sensor 50 is disposed between power source 40 and incandescent luminaire 110 as illustrated. In addition, photosensor 130 is provided adjacent to incandescent luminaire 110 and operatively coupled to sensor 50. As power is delivered from power source 40, sensor 50 can determine whether the desired levels of voltage and current are being provided. Sensor 50 is also coupled to the input and the output of the incandescent luminaire 110. Thus, current and voltage levels delivered through incandescent luminaire 110 are detected by sensor 50. As previously explained, any deviations from a preestablished norm will cause the sensor to report the appropriate problem. Photosensor 130 is located in close proximity to incandescent luminaire 110. In its simplest form, photosensor 130 can detect whether any light is being emitted from incandescent luminaire 110. This information is gathered by sensor 50 and reported to control unit 60. Photosensor 130 is also capable of detecting the level of illumination generated by incandescent luminaire 110. Thus, not only is it possible to detect an absolute failure, it is possible to determine if incandescent luminaire 110 is performing below a desired level. This will allow incandescent luminaire 110 to be replaced before it becomes critical.

LED luminaire 150 is also provided and includes sensor 55 interposed between power source 40 and each of the individual LEDs. Sensor 55 monitors the current and voltage levels being delivered to and passing through each of the various LEDs. To simplify the system, sensor 55 can simply detect the current and voltage levels being delivered to and passing through the entire set of LEDs rather than individually monitoring each LED. That is, with a large number of individual lights, it may simply be easier to monitor sets of those lights rather than each individual element.

The data gathered by each of sensors 45, 50 and 55 is delivered to control unit 60 either by a hard line connection or by receiving transmitted data. Telephone line 135 is coupled to control unit 60 so that remote monitoring and control can be established. A supplemental sensor S1 is provided in line with power source 40 to determine power levels being delivered to the system as a whole. As previously explained, control unit 60 can be coupled to an associated system 80 (as illustrated in FIG. 1). Thus, in addition to simply monitoring the status of the various luminaires, control unit 60 can cause various events to occur when errors are detected.

Figure 3:
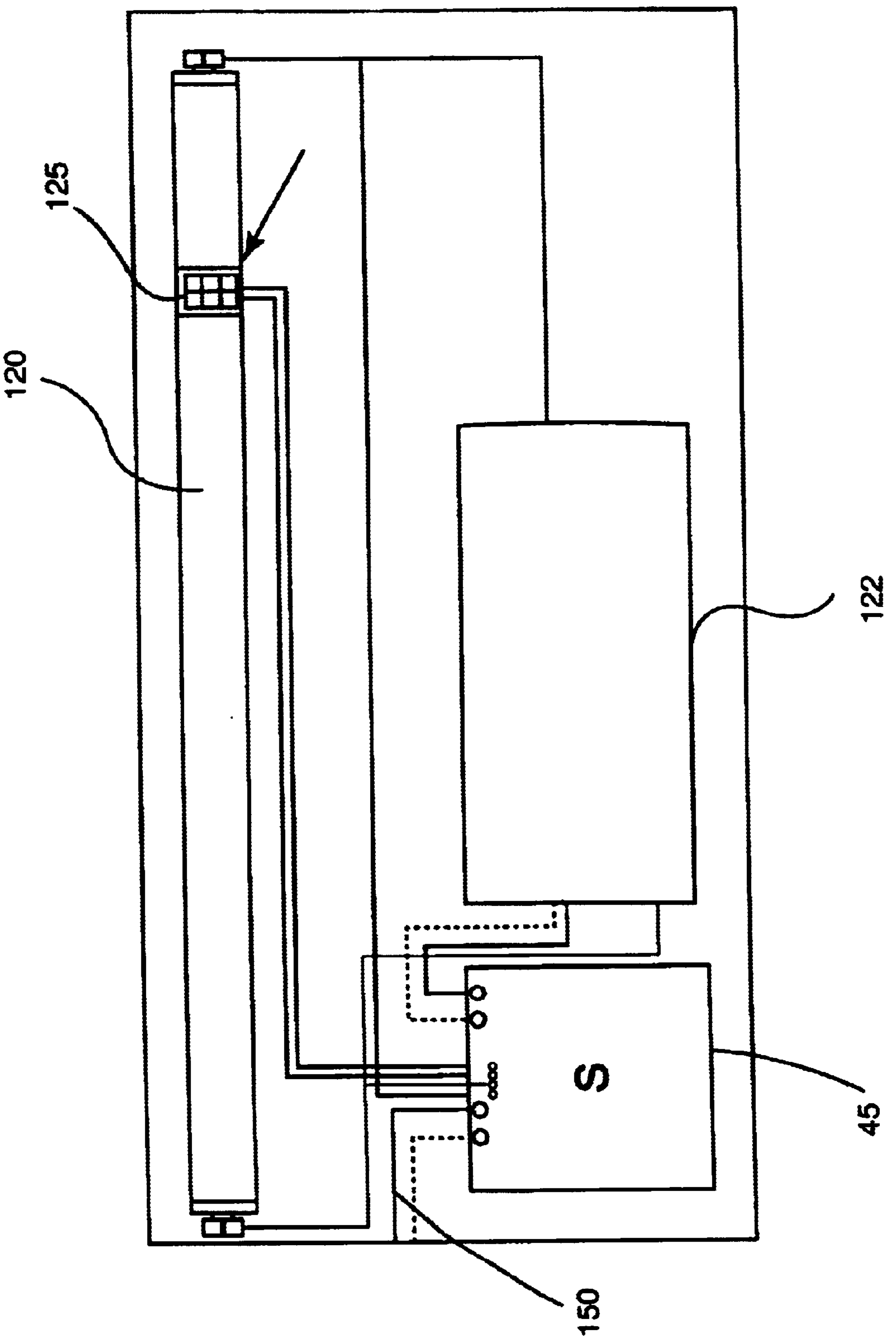
FIG. 3 is a schematic illustration of a sensor of the present invention connected to a florescent lamp.

FIG. 3 is an illustration of one florescent lamp 120 from florescent luminaire 105. Sensor 45 is provided with a power source connection 150 which delivers power from power source 40. Connections are then made to the various terminals of florescent lamp 120 as well as ballast 122 so that current is appropriately provided while initially illuminating florescent lamp 120 and maintaining that illumination. As previously explained, sensor 45 monitors the current and voltage levels being delivered to ballast 122 and florescent lamp 120 as well as monitoring what is passing through ballast 122 and florescent lamp 120. In addition, a photosensor 125 is attached to a portion of each florescent lamp 120 to actually detect whether florescent lamp 120 is illuminated and, if desired, at what level of illumination florescent level 120 is providing. This information is again passed to sensor 45 and ultimately to control unit 60.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

I claim:

1. A monitoring system for a luminaire, comprising:

a sensing unit attached to the luminaire so that the sensing unit can measure the electrical operating characteristics of the luminaire, wherein the electrical operating characteristics include the current and voltage at each of the input and the output;

a control unit operatively coupled to the sensing unit to receive measurements from the sensing unit, wherein the control unit changes a frequency at which the sensing unit measures the electrical operating characteristics of the luminaire if a problem is detected with the luminaire;

a monitor operatively coupled to the control unit to display an indication of the operative status of the luminaire.

2. The monitoring system of claim 1, further comprising:

a transmitter coupled to the control unit for the transmitting data indicative of a functional status of the luminaire;

a receiver coupled to the monitor for receiving the data transmitted from the control unit through the transmitter so that the monitor can display the indication of the operative status of the luminaire.

3. The monitoring system of claim 1 wherein the monitor is operatively coupled to the Internet so that remote access is provided to the monitor.

4. The monitoring system of claim 1 wherein the control unit acts to control an associated system, that is associated with the luminaire, when the control unit determines that the luminaire is inoperative and a backup means is not available.

5. The monitoring system of claim 4 wherein the associated system is a traffic signal.

6. The monitoring system of claim 4 wherein the associated system is a street light.

7. The monitoring system of claim 4 wherein the associated system is an automatic teller machine.

8. A luminaire monitoring system, comprising:

a current sensor operatively coupled to the luminaire for detecting electrical current flowing through the luminaire and producing a current signal indicative of any detected electrical current;

a voltage sensor operatively coupled to the luminaire for detecting the presence of an electrical voltage at a predetermined location of the luminaire and producing a voltage signal indicative of any detected electrical voltage;

a controller attached to the voltage sensor and the current sensor so as to receive the current signal and the voltage signal, and determine the operational status of the luminaire and produce a control signal indicative of the operational status; and monitoring equipment coupled to the controller for receiving control signal and providing an indication of any unexpected operational status.

9. The monitoring system of claim 8 wherein an unexpected operational status is a power failure.

10. The monitoring system of claim 8 wherein an unexpected operational status is a luminaire filament failure.

11. The monitoring system of claim 8 wherein the current sensor is capable of measuring the current at the input and the output of the luminaire.

12. The monitoring system of claim 8 wherein the predetermined location is at the input of the luminaire.

13. The monitoring system of claim 12 wherein the voltage sensor is further capable of monitoring the voltage at the output of the luminaire.

14. The monitoring system of claim 8 wherein the monitoring equipment is coupled to the controller via a transmitter operatively connected to the controller and a receiver operatively connected to the monitoring equipment.

15. The monitoring system of claim 8 wherein the monitoring device provides a display capable of communicating to maintenance personnel the existence of problems with the luminaire.

16. The monitoring system of claim 8 wherein the monitoring equipment and the controller are operatively connected to one another via a first transceiver attached to the monitoring equipment and a second transceiver attached to the controller.

17. The monitoring system of claim 8 wherein the monitoring equipment and the controller are directly connected via a communication bus.

18. The monitoring device of claim 8 wherein the control signal is also provided to a related system, the related system including the luminaire.

19. The monitoring device of claim 18 wherein the control signal includes information to alter the operation of the related system.

20. A monitoring system for monitoring the operational condition of a luminaire, the system comprising:

sensing means operatively coupled to the luminaire for determining the electrical operating characteristics of the luminaire including current flow and voltage levels at predetermined locations of the luminaire;

control means attached to the sensing means for requesting information regarding the electrical operating characteristics of the luminaire and receiving signals from the sensing means indicative of the sensed operational characteristics, said control means for further determining operating status of the luminaire based on the electrical operational characteristic;

monitoring means coupled to the control means for communicating the operating status of the luminaire.

21. The system of claim 20 wherein the sensing means includes a current sensor for monitoring the current flow into an input of the luminaire.

22. The system of claim 20 wherein the sensing means includes a voltage sensor for determining the voltage level at an input to the luminaire.

23. The system of claim 22 wherein the predetermined locations are at the input of the luminaire and the output of the luminaire.

24. The system of claim 20 wherein the monitoring means is coupled to the control means via a transmitter operatively connected to the control means and a receiver operatively connected to the monitoring means.

25. The system of claim 20 wherein the monitoring means and the control means are operatively connected to one another via a first transceiver attached to the monitoring equipment and a second transceiver attached to the controller.

26. The system of claim 20 wherein the monitoring device provides a display capable of communicating to maintenance personnel the existence of problems with the luminaire.

27. The system of claim 20 wherein the monitoring means is a display for providing a visual indication regarding the operational status of the plurality of luminaires.

28. The system of claim 20 wherein the monitoring means is a master controller coupled to a related device for providing control signals which will effect the operation of the related device based on the condition of at least one of the plurality of luminaires.

29. The system of claim 28 wherein the related device is an automated teller machine.

30. The system of claim 28 wherein the luminaire is one component of a traffic light and the related device is a traffic light controlling system for controlling the operation of the traffic light.

31. The system of claim 30 wherein the monitoring means will alter the operation of the traffic light controlling system if the control unit indicates a failure with one of the traffic lights.

32. The system of claim 31 wherein the altered operation of the traffic light control will cause selected operational traffic lights to flash.

33. The system of claim 29 wherein the monitoring means will deactivate the automated teller machine when one of the plurality of luminaires are found to be inoperative.

34. A monitoring system for monitoring the operation of a plurality of luminaires, comprising:

a plurality of sensing units, each sensing unit coupled to a luminaire and comprising;

a current sensor for sensing the current at an input to the luminaire and at an output to the luminaire, the current sensor for further producing a current signal indicative of the sensed current; and a voltage sensor for sensing the voltage at an input to the luminaire and at an output to the luminaire, the voltage sensor for further producing a voltage signal indicative of the sensed voltage;

a control unit coupled to the plurality of sensing units for receiving the plurality of voltage signals and the plurality of current signals, the control unit further capable of determining the operational status of each of the plurality of luminaires based on the received plurality of voltage signals and the received plurality of current signals, the control unit capable of producing a status output indicative of the operational status of each luminaire; and a monitoring unit coupled to the control unit to receive the status output and provide an indication of the operational status.

35. The system of claim 34 wherein the monitoring unit is a display for providing a visual indication regarding the operational status of the plurality of luminaires.

36. The system of claim 34 wherein the monitoring unit is a master controller coupled to a related device for providing control signals which will effect the operation of the related device based on the condition of at least one of the plurality of luminaires.

37. The system of claim 36 wherein the related device is an automated teller machine.

38. The system of claim 36 wherein the plurality of luminaires are traffic lights and the related device is a traffic light controlling system for controlling the operation of the traffic lights.

39. The system of claim 38 wherein the monitoring device of will disable the traffic lights if the control unit indicates a failure with one of the traffic lights.

40. The system of claim 37 wherein the monitoring device will deactivate the automated teller machine when one of the plurality of luminaires are found to be inoperative.

41. The system of claim 34 wherein the monitoring unit is coupled to the control unit via a transmitter operatively connected to the control unit and a receiver operatively connected to the monitoring unit.

42. The system of claim 41 wherein the transmitter and the receiver are both transceivers capable to two way communication.

43. The monitoring system of claim 1 wherein the frequency at which the sensing unit measures the electrical operating characteristics of the luminaire is increased when the control unit determines that the luminaire is operating at less than a predetermined efficiency.

* * * * *

UNITED STATES PATENT AND TRADEMARK OFFICE

CERTIFICATE OF CORRECTION

PATENT NO. : 6,717,660 B1
DATED : April 6, 2004
INVENTOR(S) : James S. Bernardo

It is certified that error appears in the above-identified patent and that said Letters Patent is hereby corrected as shown below:

Column 8,
Line 3, after "status", insert -- wherein the controller changes a frequency at which the sensor measures the electrical operating characteristics of the luminaire if a problem is detected with the luminaire --.
Line 52, delete "operational characteristics", and insert -- operational characteristic, wherein the frequency at which the sensing means measures the electric operating characteristics of the luminaire is increased when the control means determines that the luminaire is operating at less than predetermined efficiency --.

Column 10,
Line 9, after "luminaire", insert -- wherein the frequency at which the sensing unit measures the electrical operating characteristics of the luminaire is increased when the control unit determines that the luminare is operating at less than a predetermined efficiency --.

Signed and Sealed this

First Day of March, 2005

JON W. DUDAS
*Director of the United States Patent and Trademark Office*